(12) United States Patent
Swensen et al.

(10) Patent No.: US 8,366,113 B2
(45) Date of Patent: Feb. 5, 2013

(54) PRE-COMPRESSED SEAL INCLUDING REMOVABLE PRE-COMPRESSION MEMBER

(75) Inventors: Jeffrey Eugene Swensen, Eldersburg, MD (US); Michael Sean Parker, Laurel, MD (US); Joseph Ilbong Kim, Frederick, MD (US)

(73) Assignee: Eaton Corporation, Cleveland, OH (US)

( * ) Notice: Subject to any disclaimer, the term of this patent is extended or adjusted under 35 U.S.C. 154(b) by 331 days.

(21) Appl. No.: 12/813,118

(22) Filed: Jun. 10, 2010

(65) Prior Publication Data

US 2011/0304103 A1     Dec. 15, 2011

(51) Int. Cl.
  *F16J 15/02*     (2006.01)
(52) U.S. Cl. ........................ 277/312; 277/644
(58) Field of Classification Search ............... 277/312, 277/608–609, 616, 626, 630, 637, 643, 644
  See application file for complete search history.

(56) References Cited

U.S. PATENT DOCUMENTS

| | | | | |
|---|---|---|---|---|
| 2,366,161 | A * | 1/1945 | Tweedale | 277/638 |
| 3,761,102 | A * | 9/1973 | Nicholson | 277/647 |
| 4,191,384 | A | 3/1980 | Svedberg | |
| 6,464,229 | B1 * | 10/2002 | Kogler et al. | 277/314 |
| 6,648,333 | B2 * | 11/2003 | Aksit et al. | 277/316 |
| 6,932,353 | B2 | 8/2005 | Amos et al. | |
| 2008/0106046 | A1 | 5/2008 | Datta et al. | |
| 2009/0155671 | A1 * | 6/2009 | Reytier et al. | 429/35 |

FOREIGN PATENT DOCUMENTS

| | | |
|---|---|---|
| EP | 0 229 584 A2 | 7/1987 |
| EP | 1 327 748 A1 | 7/2003 |

OTHER PUBLICATIONS

International Search Report dated Sep. 29, 2011.

\* cited by examiner

*Primary Examiner* — Vishal Patel
(74) *Attorney, Agent, or Firm* — Bradley J. Diedrich

(57) ABSTRACT

A seal is provided that includes a resilient, arc-shaped body having a pair of sealing portions movable between a pre-compressed state and a compressed state. A removable, arc-shaped pre-compression member slidingly engages the seal body along at least a portion of its length to hold the sealing portions in the pre-compressed state.

15 Claims, 5 Drawing Sheets

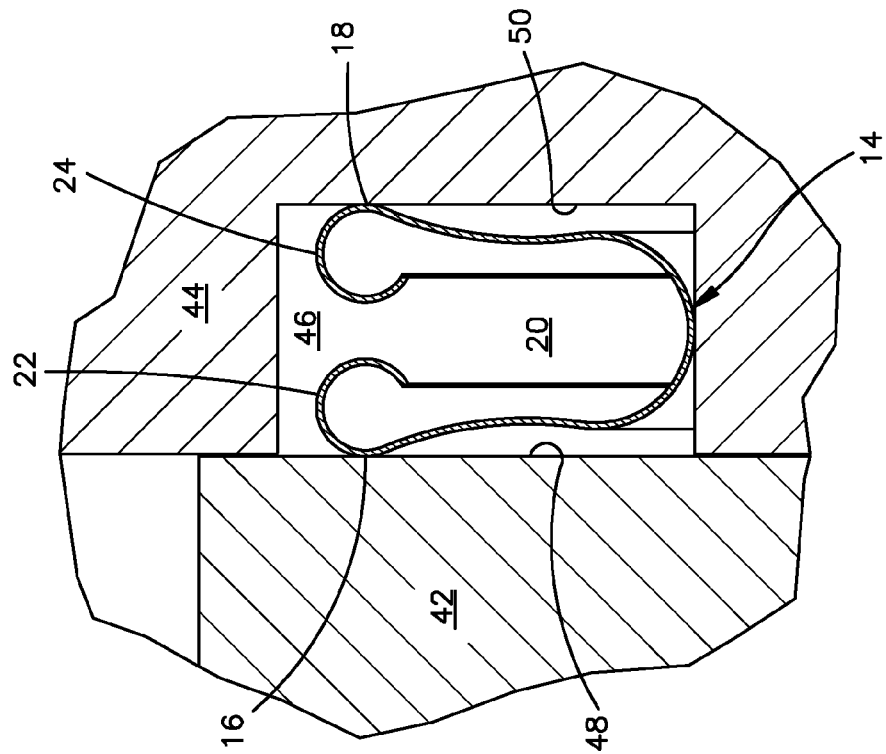
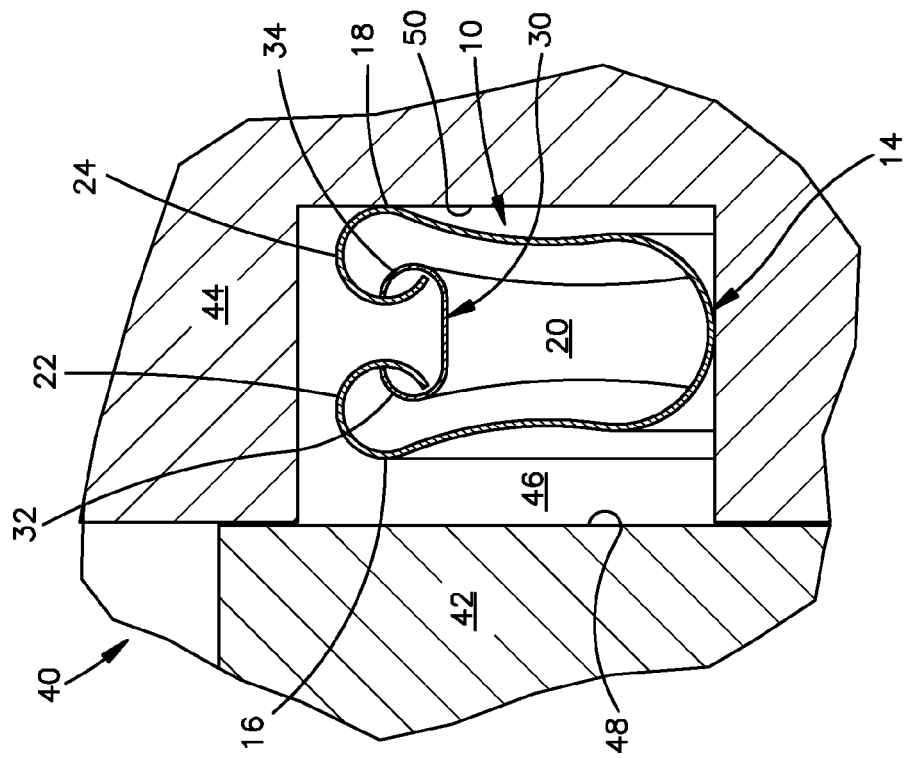

PRE-COMPRESSED SEAL INCLUDING REMOVABLE PRE-COMPRESSION MEMBER

BACKGROUND OF THE DISCLOSURE

The present invention relates to resilient seals for use in gas turbines or other devices requiring a sealing function between separate components, and particularly to a pre-compressed seal and method for retaining the pre-compressed seal in a pre-compressed state for installation into a gas turbine. In particular, the present invention relates to seals used in equipment typically divided into portions of a complete ring to facilitate assembly due to scale or complexity.

In a gas turbine, hot gases flow through components of the various turbine and compressor stages. To minimize or prevent leakage flow between turbine engine components, seals have been developed and disclosed in U.S. Pat. Nos. 6,648,333 and 6,932,353, which describe seals having reversely folded marginal portions received in a cavity formed between two components. At operating conditions, the marginal portions seal against the base of the cavity and an adjacent turbine component to prevent leakage flow past the turbine components. To install the seal, the seal body is first compressed and maintained in a compressed state by applying one or more wraps about the seal body or a clip or an epoxy. At operating temperatures, the wrap, clip or epoxy burns off and releases the seal to engage the marginal portions against opposite sealing surfaces of the two components. Among other limitations, debris created as the wrap, clip or epoxy burns off may travel through the gas turbine and damage turbine components.

BRIEF SUMMARY OF THE INVENTION

A seal is provided that includes a resilient, arc-shaped body having a pair of sealing portions movable between a pre-compressed state and a compressed state. A removable, arc-shaped pre-compression member slidingly engages the seal body along at least a portion of its length to hold the sealing portions in the pre-compressed state.

BRIEF DESCRIPTION OF THE DRAWINGS

FIG. 4 is a cross-sectional view of a gas turbine showing a seal according to an embodiment of the present invention positioned between two turbine components in a pre-compressed state.

FIG. 5 is a cross-sectional view of the gas turbine of FIG. 4 showing the seal in a compressed or installed state with the pre-compression released.

DETAILED DESCRIPTION OF THE PREFERRED EMBODIMENT

Figure 2:
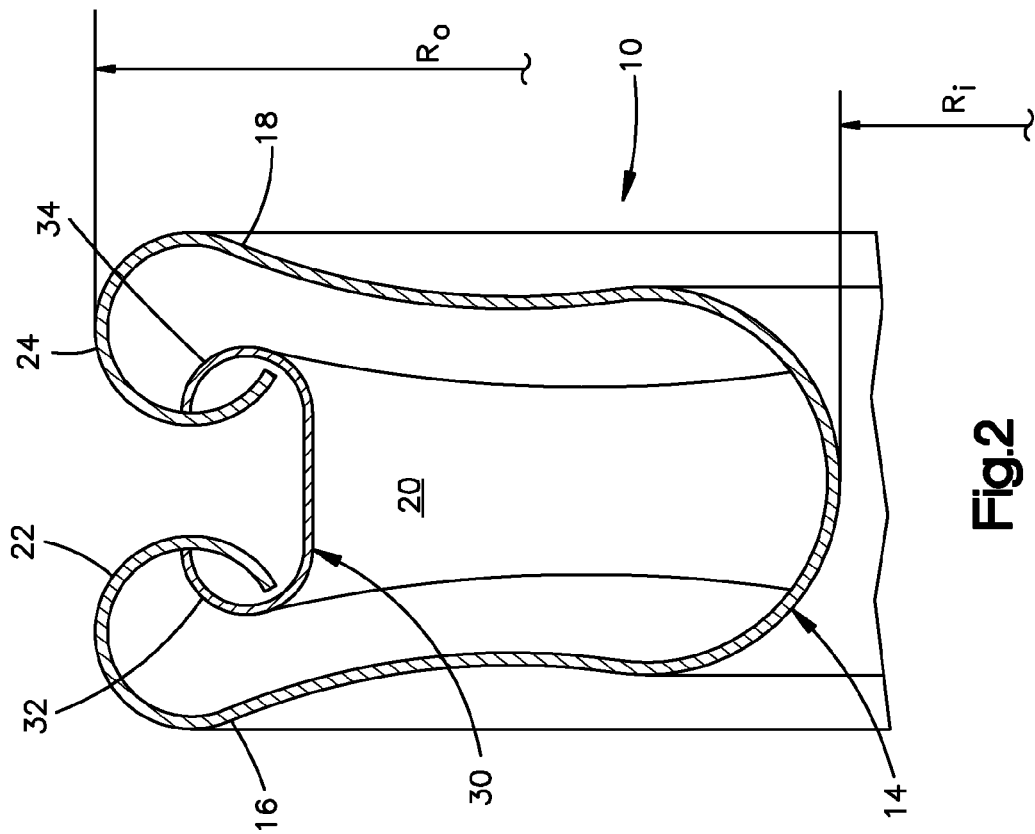
FIG. 2 is a cross-sectional view of the seal of FIG. 1.
Figure 1:
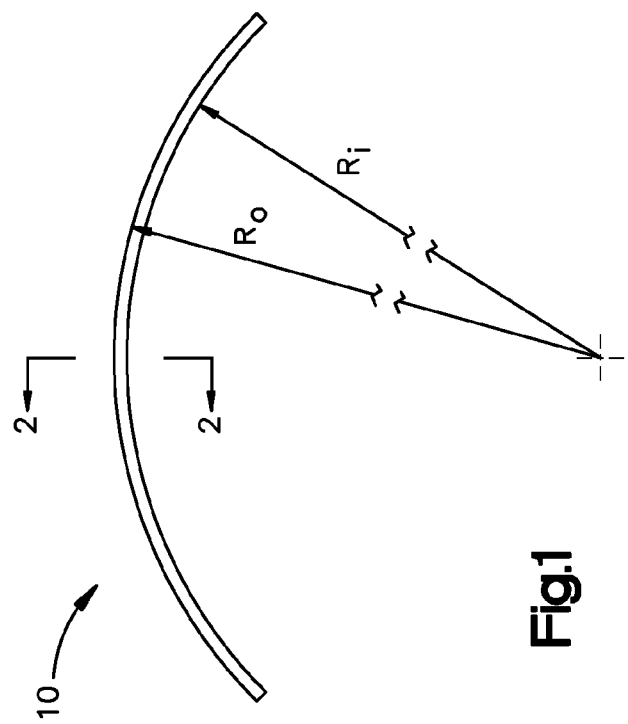
FIG. 1 is a plan view of a seal according to an embodiment of the present invention.

Referring now to the drawings, which are not intended to limit the invention, FIGS. 1 and 2 illustrate a segmented seal 10 according to an embodiment of the present invention. Seal 10 includes a resilient, arc-shaped body 14 having a generally U-shaped cross-section. Body 14 includes a pair of sealing portions 16, 18 defining a gap 20 in between. Each of the sealing portions 16, 18 includes a first retaining feature 22, 24, respectively, which extend into the gap 20. Body 14 is manufactured of a metal alloy, such as Inconel 718 or other suitable material used in gas turbines, using known manufacturing techniques. Body 14 may be manufactured in the desired segment length or longer lengths and then cut into segments (e.g., 4×90°, 6×60°, etc.). Body 14 has a minimum radius $R_i$ and a maximum radius $R_o$.

Seal 10 also includes a removable, arc-shaped, pre-compression member 30 slidingly received in the gap 20. Pre-compression member 30 includes a pair of second retaining features 32, 34 that engage the first retaining features 22, 24, respectively, to hold the sealing portions 16, 18 in a pre-compressed state shown in FIG. 2. The first and second retaining portions 22, 24, 32, 34 include interlocking ends that prevent the pre-compression member 30 from being removed from the body 14 except by sliding the pre-compression member 30 relative to and along the length of the body 14.

Figure 3:
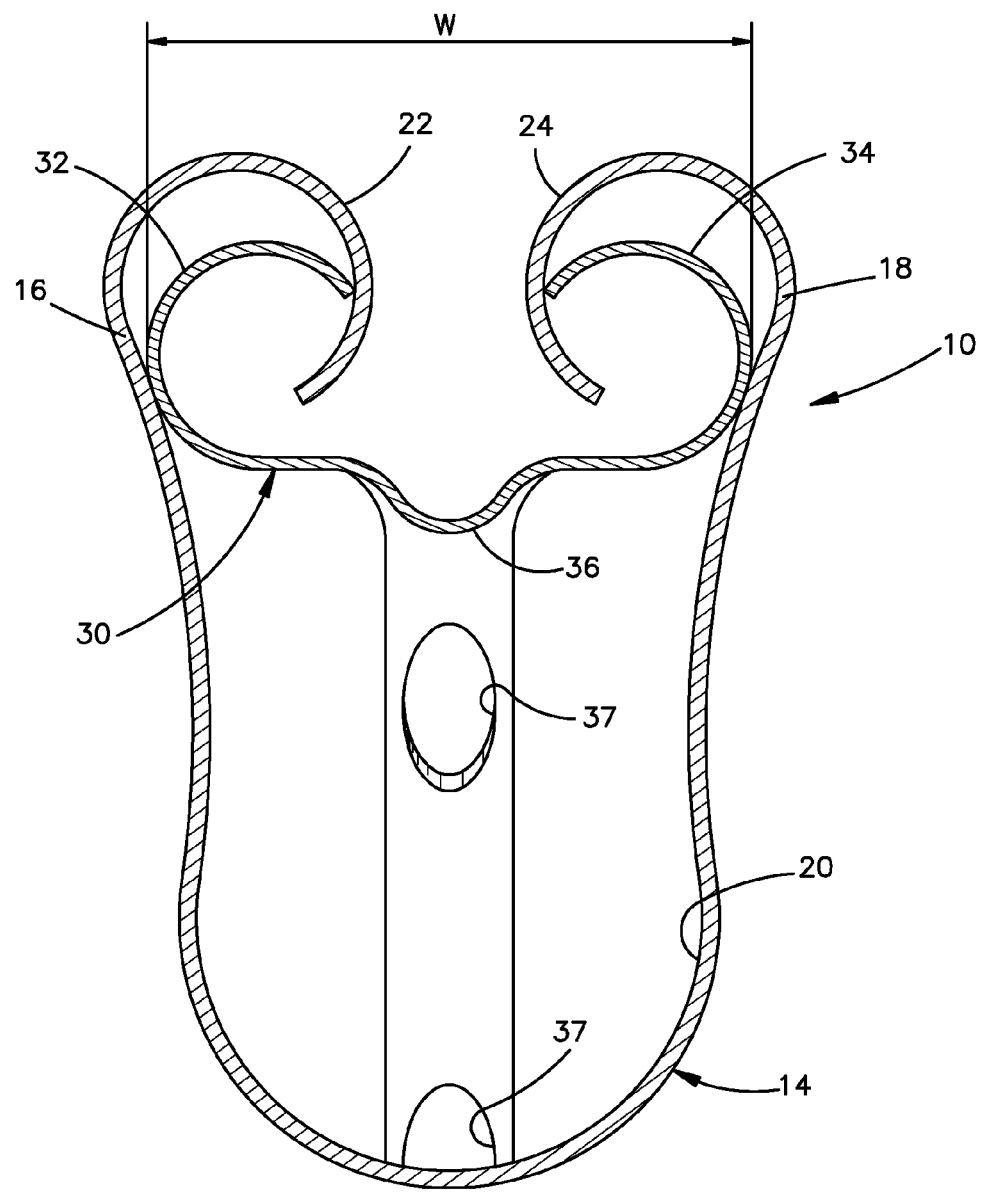
FIG. 3 is a cross-sectional view of a seal according to another embodiment of the present invention.

As shown in the embodiment of FIG. 3, pre-compression member 30 may be configured with an axial width W large enough to permit second retaining features 32, 34 to either contact (as shown in FIG. 3) or be closely positioned proximate first retaining features 22, 24 or sealing portions 16, 18 in the pre-compressed state. In this configuration, pre-compression member 30 is sized both to provide the desired amount of pre-compression and to prevent further compression of seal 10 that may cause disengagement of first and second retaining portions 22, 24, 32, 34 prior to installation.

In the illustrated embodiments, retaining portions 22, 24, 32, 34 exhibit a generally curved profile for ease of manufacture; however, non-curved profiles may also be used. In an exemplary implementation of the embodiment shown in FIG. 3, body 14 exhibits curved first retaining features 22, 24 each having a radius of about 0.07 in (1.78 mm). The described radius was found to be large enough to facilitate manufacturing, but not so large as to reduce the stiffness of first retaining features 22, 24 and prevent seal 10 from being retained in the pre-compressed state. The described radius also prevents the lever arm or effective length of the seal (i.e., the radial dimension extending from the bottom of the "U" in seal 10, outwards to the points at which seal 10 contacts the cavity (as explained below)) from being too short—a characteristic that reduces the spring-back or resiliency of seal 10. In the same implementation of the invention, pre-compression member 30 exhibits curved retaining features 32, 34 each having a radius of about 0.06 in (1.52 mm), allowing retaining features 32, 34 to fit inside of retaining features 22, 24 and provide enough rigidity to maintain pre-compression. A convolution 36 having a radius of about 0.035 in (0.89 mm) is located between retaining features 32, 34 to provide longitudinal stiffness that facilitates the pre-compression manufacturing process. Pre-compression member 30 may also include at least one and more preferably a plurality of holes 37 spaced apart a predetermined distance (e.g., approximately 1 ft (30.48 cm) apart) along its length. Holes 37 allow pre-compression member 30 to be gripped during removal from seal 10 in a manner that provides the most mechanical advantage and best angle to pull from throughout the removal process. The dimensions of pre-compression member 30 described above are exemplary and are not intended to limit the scope of the invention.

Pre-compression member 30 may be made from the same material as body 14 or other less expensive metal alloys or polymers since, unlike the prior art seals, the pre-compression member will not be subject to operating conditions of the turbine. During manufacture of seal 10, pre-compression member 30 is installed by compressing all or a portion of the seal segment to a height that allows pre-compression member 30 to be easily drawn through all or merely a portion of the seal body segment such that first and second retaining features 22, 24, 32, 34, are aligned and engaged to sufficiently retain seal 10 in the pre-compressed state. The manufacturing process may be accomplished manually, such as with a hand tool, or by using a fixture that maintains drawing force along the seal radius while compressing seal 10. Seal 10 and pre-compression member 30 may be lubricated using, for example, either a wet or dry high film strength lubricant, to ease the pre-compression process and subsequent release of seal 10 during installation.

Referring to FIGS. 4 and 5, a segmented portion of a gas turbine 40 is shown that includes a first turbine component 42 and a second turbine component 44. First and second turbine components 42, 44 represent, for example, a turbine nozzle segment and a nozzle support ring or other turbine structure around which hot combustion gases may flow. A cavity 46 is defined between the first and second turbine components 42, 44 within which seal 10 is positioned. Cavity 46 defines, at least in part, a pair of adjacent sealing surfaces 48, 50. In FIG. 3, the sealing portions 16, 18 are located during assembly of the turbine between the adjacent sealing surfaces 48, 50 and held in a pre-compressed state by the pre-compression member 30 where only one (as shown) or none of the sealing portions 16, 18 are in contact with the adjacent sealing surfaces 48, 50.

In FIG. 5, the pre-compression member 30 is removed by sliding the arc-shaped pre-compression member 30 relative to and along the length of the arc-shaped body 14 releasing the resilient sealing portions 16, 18 for movement into a compressed state defined by sealing engagement with the adjacent sealing surfaces 48, 50. In practice, pre-compression member 30 is removed by pulling on pre-compression member 30 with a tool gripping the member 30 while simultaneously holding seal 10 in place with a second tool or fixture that inhibits frictionally induced forces from removing seal 10 from cavity 46. For larger seals 10, it may be necessary to utilize some form of mechanical advantage to affect removal of pre-compression member 30.

Figure 7:
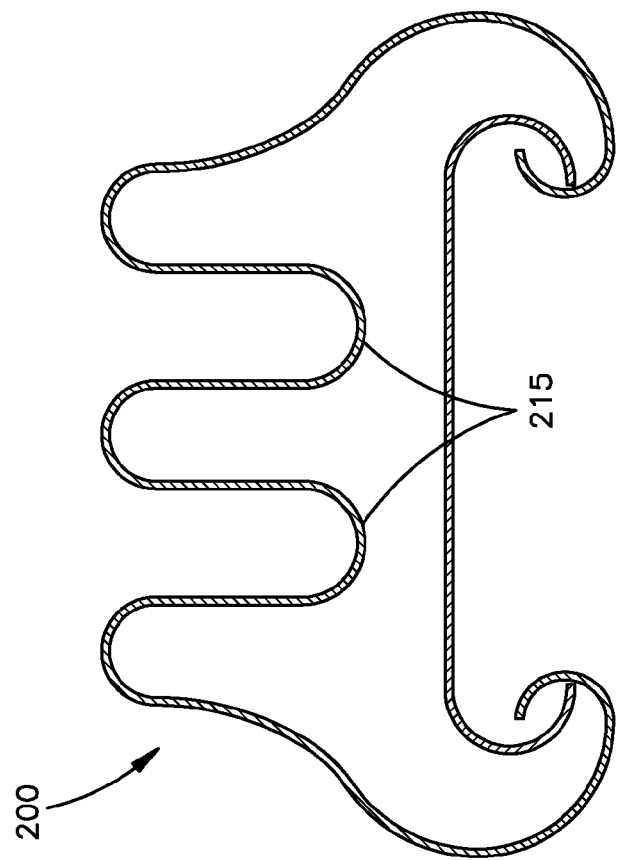
FIG. 7 is a cross-sectional view of a seal according to another embodiment of the present invention.
Figure 6:
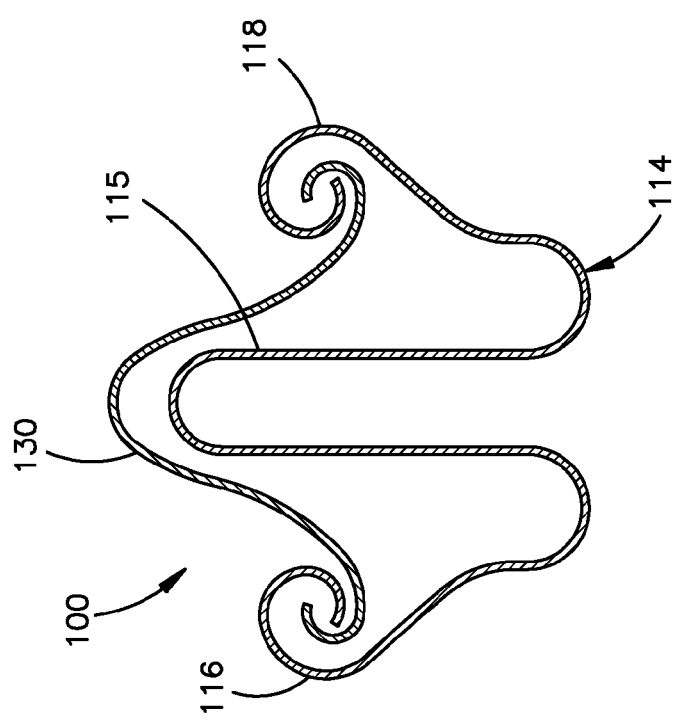
FIG. 6 is a cross-sectional view of a seal according to another embodiment of the present invention.

Referring to FIGS. 6 and 7, seals 100 and 200 according to different embodiments of the present invention are shown. In the embodiment shown in FIG. 6, seal 100 is substantially similar to seal 10, except that body 114 includes a convoluted portion 115 between the pair of sealing portions 116, 118. The pre-compression member 130 is shaped to accommodate the convolution 115. The embodiment shown in FIG. 7 includes a plurality of convolutions 115 of substantially even amplitude; however, the convolutions in both embodiments may have various shapes and sizes.

Figure 8:
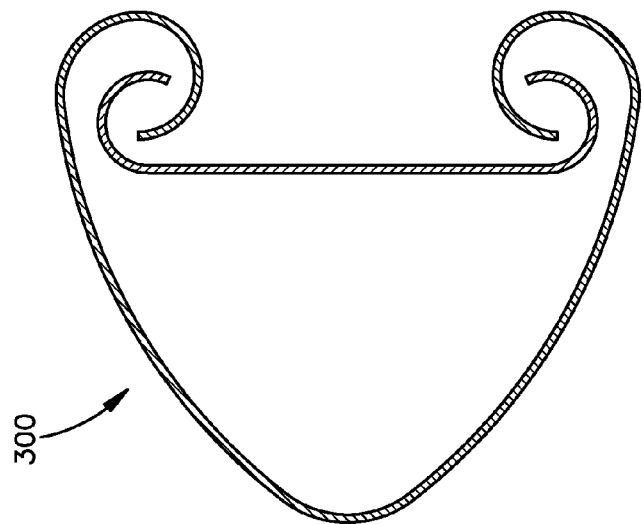
FIG. 8 is a cross-sectional view of a seal according to another embodiment of the present invention.

Referring to FIG. 8 a seal 300 is shown that is substantially similar to seal 10, except that body 114 exhibits a generally V-shaped cross-section. Various manipulations of the cross-sectional shape may be made to accommodate seal glands or cavities of different aspect ratios of height and width. Attendant variations in operating stress range associated with such cross-sectional forms are considered in the design optimization process.

Figure 9:
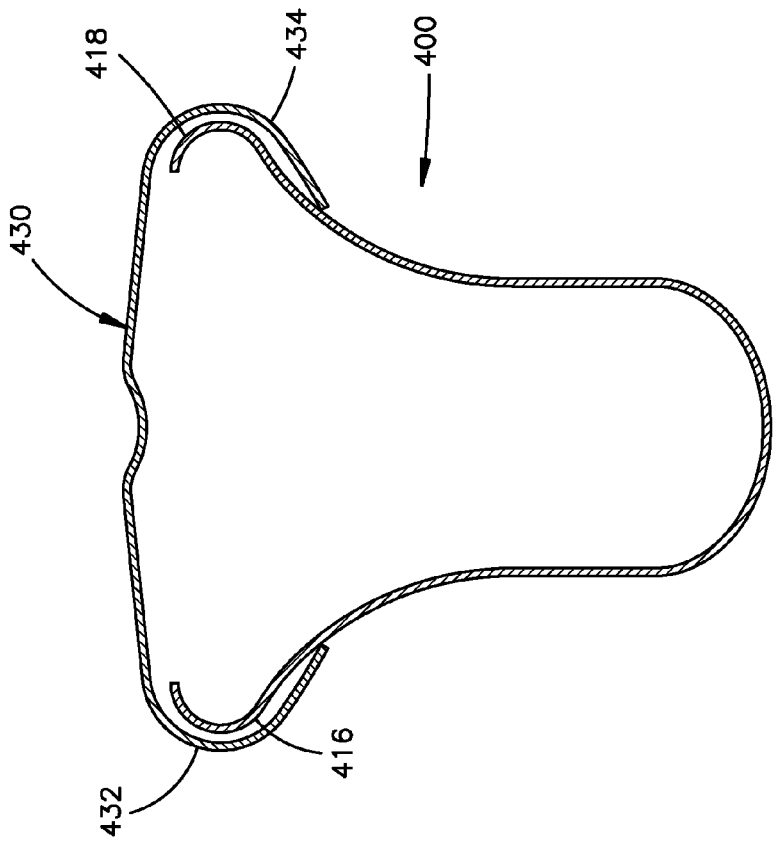
FIG. 9 is a cross-sectional view of a seal according to another embodiment of the present invention.

Referring to FIG. 9, a seal 400 is shown that is substantially similar to seal 10 except that second retaining features 432, 434 of pre-compression member 430 are configured to extend over and engage an outer surface of sealing portions 416, 418.

While several seal configurations have been illustrated to describe the invention, the invention is not limited to the illustrated embodiments.

Among other features, the inventive seal 10 prevents damage to a turbine caused by debris generated by prior art seals as the pre-compression wrap, clip, or epoxy material is burned off during operation of the engine. The invention also allows the pre-compression in seal 10 to be released during installation, but prior to engine operation, which allows the installer to ensure that seal 10 is properly installed and orientated in cavity 46. Prior art pre-compressed seals are neither seated nor engaged in cavity 46 until the engine is operated. This limitation leaves open the possibility that once the wrap, clip, or epoxy is burned off, the prior art seal may not be properly seated in the cavity and may lead to excessive leakage or break up and cause damage to the engine.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A seal comprising:
   a resilient, arc-shaped seal body including a pair of sealing portions movable between a pre-compressed state and a compressed state;
   a removable, arc-shaped pre-compression member slidingly engaging the seal body along at least a portion of its length to hold the sealing portions in the pre-compressed state; and
   the sealing portions define a gap in between, each of the sealing portions including a first retaining feature extending into the gap; and wherein the removable, arc-shaped pre-compression member is slidingly received in the gap and includes a pair of second retaining features engaging the first retaining features to hold the sealing portions in the pre-compressed state.

2. The seal of claim 1, wherein the pre-compression member is configured with an axial width large enough to permit the second retaining features to either contact or be closely positioned proximate the first retaining features or the sealing portions in the pre-compressed state.

3. The seal of claim 1, wherein the first and second retaining portions include interlocking ends that prevent the pre-compression member from being removed from the body except by sliding the pre-compression member relative to and along the length of the body.

4. The seal of claim 1, wherein the pre-compression member includes a convolution between the second retaining features.

5. The seal of claim 1, wherein the pre-compression member includes at least one hole to facilitate removal of the pre-compression member from the seal body.

6. The seal of claim 1, wherein the seal body is generally U-shaped or V-shaped cross-section.

7. The seal of claim 1, wherein the seal body includes a convoluted portion between the sealing portions.

8. The seal of claim 7, wherein the pre-compression member is shaped to accommodate the convoluted portion.

9. A method of installing a seal in a turbine having a pair of adjacent sealing surfaces, comprising the steps of: providing a seal having a resilient arc-shaped body including a pair of resilient sealing portions movable between a pre-compressed state and a compressed state, a removable, rigid, arc-shaped pre-compression member slidingly engaging the seal body to hold the sealing portions in the pre-compressed state; locating the seal between the adjacent sealing surfaces; and sliding the arc-shaped pre-compression member relative to and along the length of the arc-shaped body releasing the resilient sealing portions for movement into engagement with the adjacent sealing surfaces in the compressed state; wherein the providing step further includes providing a pair of sealing portions defining a gap in between, each of the sealing portions including a first retaining feature extending into the gap, and providing a pre-compression member slidingly received in the gap and including a pair of second retaining features engaging the first retaining features to hold the sealing portions in the pre-compressed state.

10. The method of claim 9, furthering including the step of providing a pre-compression member configured with an axial width large enough to permit the second retaining features to either contact or be closely positioned proximate the first retaining features or the sealing portions in the pre-compressed state.

11. The method of claim 9, furthering including the step of providing a pre-compression member including a convolution between the second retaining features.

12. The method of claim 9, furthering including the step of providing a pre-compression member including at least one hole for facilitating removal of the pre-compression member from the seal body.

13. The method of claim 9, wherein the providing step further includes providing a body having a generally U-shaped or V-shaped cross-section.

14. The method of claim 9, wherein the providing step further includes providing a body having a convoluted portion between the sealing portions.

15. The method of claim 13, wherein the pre-compression member is shaped to accommodate the convoluted portion.

* * * * *